US010007991B2

(12) United States Patent
Hyre et al.

(10) Patent No.: US 10,007,991 B2
(45) Date of Patent: Jun. 26, 2018

(54) LOW-COST METHOD TO RELIABLY DETERMINE RELATIVE OBJECT POSITION

(71) Applicant: International Business Machines Corporation, Armonk, NY (US)

(72) Inventors: Bruce H. Hyre, Cary, NC (US); Chiao-Fe Shu, Scarsdale, NY (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 15/011,355

(22) Filed: Jan. 29, 2016

(65) Prior Publication Data

US 2017/0221192 A1 Aug. 3, 2017

(51) Int. Cl.
G06T 7/00 (2017.01)
H04N 7/18 (2006.01)
G06K 9/62 (2006.01)

(52) U.S. Cl.
CPC ............ *G06T 7/004* (2013.01); *G06K 9/6215* (2013.01); *H04N 7/181* (2013.01)

(58) Field of Classification Search
CPC ........... G06T 7/001; G06T 2207/20081; G06T 2207/30148; G06T 7/0008; G01N 21/9501; G01N 21/95607; G01N 2021/95676; G01N 2201/12; G06N 99/005; G03F 1/84; G03F 7/7065; G06K 9/6232
See application file for complete search history.

(56) References Cited

U.S. PATENT DOCUMENTS

| 8,055,059 | B2 * | 11/2011 | Fang ...................... G06K 9/627 382/106 |
| 8,243,136 | B2 | 8/2012 | Aota et al. |
| 8,488,021 | B2 | 7/2013 | Yang |
| 8,527,235 | B2 | 9/2013 | Tanigawa |

(Continued)

OTHER PUBLICATIONS

Darwish, "Wearable and Implantable Wireless Sensor Network Solutions for Healthcare Monitoring", Sensors 2011, 5561-5595, vol. 11, Issue 6, Jun. 2011.

(Continued)

*Primary Examiner* — Sean Conner
*Assistant Examiner* — Pinalben Patel
(74) *Attorney, Agent, or Firm* — North Shore Patents, P.C.; Michele Liu Baillie

(57) ABSTRACT

A system for detecting a change in object positioning by processing images by detecting a first entity tagged with a first visually unique identifier, and detecting a second entity tagged with a second visually unique identifier distinguishable from the first visually unique identifier. The system receives a first image, from a first image capturing device, containing the first visually unique identifier and the second visually unique identifier. The system analyzes the first image to determine a distance between the first visually unique identifier and the second visually unique identifier. The system receives a second image containing the first visually unique identifier. The system analyzes the second image to determine a location of the second visually unique identifier relative to the first visually unique identifier to form a distance assessment. Based on the distance assessment, the system determines a change in proximity between the first entity and the second entity.

19 Claims, 2 Drawing Sheets

(56) References Cited

U.S. PATENT DOCUMENTS

| | | | |
|---|---|---|---|
| 8,737,688 B2* | 5/2014 | Murphy | G06F 17/30247 |
| | | | 382/103 |
| 2008/0232641 A1* | 9/2008 | Borger | G07F 9/026 |
| | | | 382/103 |
| 2011/0029278 A1* | 2/2011 | Tanigawa | G01S 5/0294 |
| | | | 702/150 |
| 2011/0316697 A1* | 12/2011 | Krahnstoever | G08B 13/19608 |
| | | | 340/540 |
| 2012/0026335 A1* | 2/2012 | Brown | G01S 5/16 |
| | | | 348/159 |
| 2016/0293218 A1* | 10/2016 | Hanis | G06K 7/10297 |

OTHER PUBLICATIONS

Micilotta, "Detection and Tracking of Humans by Probabilistic Body Part Assembly", CVSSP, University of Surrey, http://personal.ee.surrey.ac.uk/Personal/R.Bowden/publications/bmvc05/micilotta_et_al_BMVC2005.pdf, 2005.

Olivares, "Wagyromag: Wireless sensor network for monitoring and processing human body movement in healthcare applications", Journal of Systems Architecture, May 23, 2011, pp. 905-915, vol. 57, Issue 10.

* cited by examiner

LOW-COST METHOD TO RELIABLY DETERMINE RELATIVE OBJECT POSITION

BACKGROUND

There are many circumstances where knowing the position of one object relative to another object is important. For example, in a hospital setting, care givers need to know if an Intravenous (IV) needle has been removed from a patient's arm, or if a patient is no longer in the hospital bed, or if the patient has not moved within the hospital bed for a period of time. In another example, a security gate may recognize that an authorized person is near the security gate, and the security gate may open automatically for that authorized person, or the security gate may open for an unauthorized person if the unauthorized person is escorted by an authorized person. In yet another example, notification that two chemicals which should not be in proximity to each other are too close to each other would be extremely helpful. Various available technologies are not suitable for detecting the position of one object relative to another object. Ultrasonic technology is very expensive and requires installing new infrastructure, such as new ultrasonic receivers. Ultrasonic technology also may not work for detecting proximity in small spaces, such as the distance between an IV needle and a patient's arm. Radio Frequency IDentification (RFID) technology also has disadvantages such as positional accuracy. Therefore, there is a need to determine the position of one object relative to another that is accurate, yet low cost (for example, by using the existing infrastructure, existing security cameras, etc.), and can be implemented quickly.

SUMMARY

According to an embodiment of the present invention, in a method for detecting a change in object positioning by processing images, the method detects a first entity tagged with a first visually unique identifier. The method detects a second entity tagged with a second visually unique identifier that is distinguishable from the first visually unique identifier. The method receives a first image, from a first image capturing device, that contains the first visually unique identifier and the second visually unique identifier. The method analyzes the first image to determine a distance between the first visually unique identifier and the second visually unique identifier. The method receives a second image, from a second image capturing device, that contains the first visually unique identifier. The method then analyzes the second image to determine a location of the second visually unique identifier relative to the first visually unique identifier to form a distance assessment. Based on the distance assessment, the method determines a change in proximity between the first entity and the second entity. In an example embodiment, the method maps the change in proximity between the first entity and the second entity against a timeline, and provides notification if the change in proximity does not meet a predetermined threshold with respect to the timeline. In another example embodiment, the method detects that the distance assessment is within a predetermined tolerance, and provides notification that the first entity and the second entity are in proximity to each other. The method may then modify a status associated with the second entity because of the proximity between the first entity and the second entity. The method may also provide notification that the first entity and the second entity should not be in proximity to each other.

In an example embodiment, the method detects that the distance assessment exceeds a predetermined range, and provides notification of the change in proximity between the first entity and the second entity. When the method detects that the distance assessment exceeds a predetermined range, the method determines that the second visually unique identifier is not present in the second image. The method determines that the distance between the first visually unique identifier and the second visually unique identifier exceeds the predetermined range based on an absence of the second visually unique identifier.

When the method tags the second entity with a second visually unique identifier that is distinguishable from the first visually unique identifier, the method tags the second entity with at least one of a colored visually unique identifier, a patterned visually unique identifier, a shaped visually unique identifier, an image, and an electronically active visually unique identifier.

When the method receives the second image, from the second image capturing device, the method identifies that the second image capturing device is the same image capturing device as the first image capturing device.

When the method receives the second image, from the second image capturing device, the method detects that the second visually unique identifier is not present in the second image, and determines a location of the first entity by the absence of the second visually unique identifier.

System and computer program products corresponding to the above-summarized methods are also described and claimed herein.

DETAILED DESCRIPTION

Figure 1:
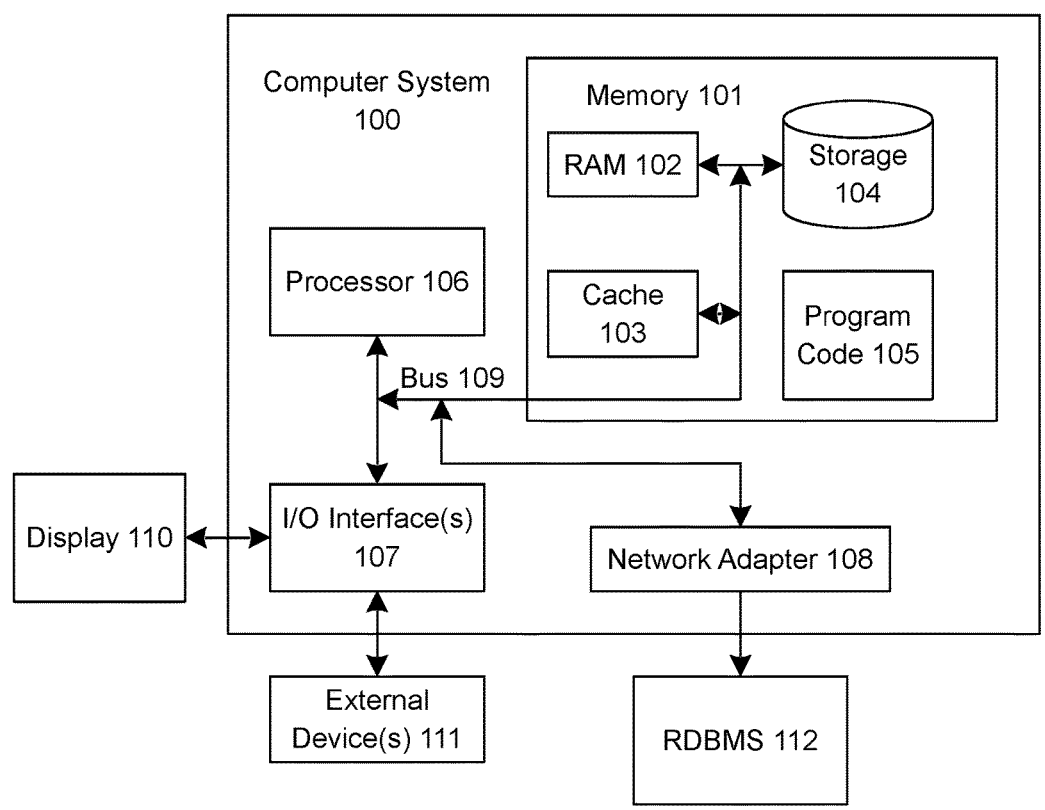
FIG. 1 illustrates an embodiment of a system for detecting a change in object positioning by processing images, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for detecting a change in object positioning by processing images according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
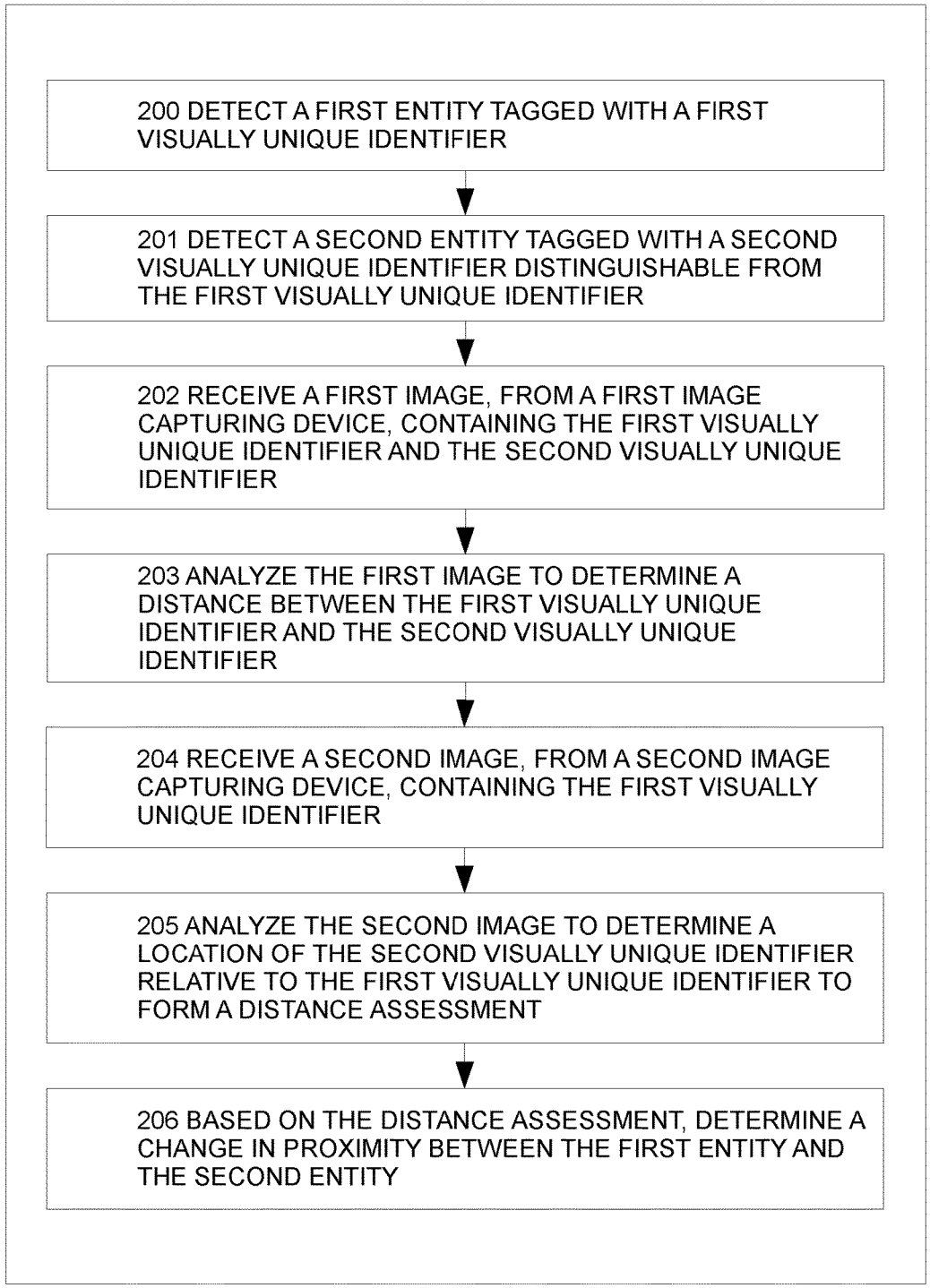
FIG. 2 is a flowchart illustrating an embodiment of a method for detecting a change in object positioning by processing images, according to embodiments disclosed herein.

FIG. 2 illustrates an embodiment of a method for detecting a change in object positioning by processing images. At 200, the method detects a first entity tagged with a first visually unique identifier. For example, the tag may be a large one dimensional or two dimensional barcode, or an active visual tag, such as an LED that blinks a unique pattern discernible by a camera. The tag may be easily and quickly affixed to the first entity.

At 201, the method detects a second entity tagged with a second visually unique identifier distinguishable from the first visually unique identifier. As in the first visually unique identifier, the second visually unique identifier may be any type of visual tag that is distinguishable from the first visually unique identifier. The first visually unique identifier and the second visually unique identifier are detected and discernible by an image capturing device.

At 202, the method receives a first image, from a first image capturing device, where the image contains the first visually unique identifier and the second visually unique identifier. The image capturing device may be any type of device that captures/produces an image. In an example embodiment, the image capturing device may be an existing security camera. Thus, no new or additional equipment is needed for the method to detect a change in object positioning by processing the images captured/produced by the image capturing device.

At 203, the method analyzes the first image to determine a distance between the first visually unique identifier and the second visually unique identifier. In an example embodiment, the first visually unique identifier may be a tag on an IV needle, and the second visually unique identifier may be a different tag on a patient's arm near the injection site or entry point of the IV needle. The first image may show the position of the tag on the IV needle and the position of the tag on the patient's arm. The method analyzes the first image to determine the distance between the IV needle and the patient's arm. Ideally, the IV needle should remain in the patient's arm.

At 204, the method receives a second image, from a second image capturing device, the second image containing the first visually unique identifier. In an example embodiment, after the method has received the first image, the method receives a second image, from a second capturing device where the second image contains the first visually unique identifier. For example, the first image from the first image capturing device may be taken in an operating room, and the second image from the second image capturing device, may be taken in a recovery room, or in the patient's hospital room.

At 205, the method analyzes the second image to determine a location of the second visually unique identifier relative to the first visually unique identifier to form a distance assessment. The distance assessment, for example, may be an distance between the first visually unique identifier and the second visually unique identifier, the number of pixels between the first visually unique identifier and the second visually unique identifier, etc. In an example embodiment, the second image contains both the first visually unique identifier and the second visually unique identifier. The method analyzes the second image to determine the distance between the first visually unique identifier and the second visually unique identifier. The method determines the relative position of the first visually unique identifier and the second visually unique identifier in the first image with respect to the relative position of the first visually unique identifier and the second visually unique identifier in the second image to form the distance assessment. For example, in the IV needle (first visually unique identifier) and patient's arm (second visually unique identifier) scenario, the method may analyze the pixels in the first image and the second image to form the distance assessment between the IV needle (first visually unique identifier) and the patient's arm (second visually unique identifier). If the IV needle (first visually unique identifier) and the patient's arm (second visually unique identifier) are farther than X pixels apart, the method may provide notification, an alert, a warning, an alarm, etc.

At 206, based on the distance assessment, the method determines a change in proximity between the first entity and the second entity. In an example embodiment, the method compares the proximity of the first visually unique identifier and the second visually unique identifier in the first image to the proximity of the first visually unique identifier and second visually unique identifier in the second image to determine any change in proximity (or no change in proximity) between the first visually unique identifier and second visually unique identifier. For example, in the IV needle (first visually unique identifier) and patient's arm (second visually unique identifier) scenario, the method may determine that the IV needle has moved, but the needle is still in the vein in the patient's arm. In another example, the method may determine that the IV needle has come out of the patient's arm, and a caregiver needs to be alerted to the situation. The method tracks the relational position between the first entity and the second entity real time through the combination of computational accuracy (i.e., the locations of the first visually unique identifier and second visually unique identifier that are discernible by the image processing devices) and the relative position of the tagged first entity and tagged the second entity.

In an example embodiment, the method maps the change in proximity between the first entity and the second entity against a timeline, and provides notification if the change in proximity does not meet a predetermined threshold with respect to the timeline. For example, the first visually unique identifier may be a tag on a pillow in a hospital bed, and the second visually unique identifier may be a tag on a patient's hospital gown. The method may detect that the patient has not moved in the bed within a certain period of time based on the change in proximity (or, in this case, the lack of change in proximity) between the tag on the pillow (first visually unique identifier) and the tag on the patient's hospital gown (second visually unique identifier). Or, the first visually unique identifier may be a tag on the patient's head (or on a bandage wrapped around the patient's head), and the second visually unique identifier may be a tag on the patient's wrist (for example, a hospital bracelet). The method may provide notification if the change in proximity between the patient's head and wrist does not meet a predetermined threshold over a period of time (i.e., with respect to the timeline).

In an example embodiment, the method detects that the distance assessment is within a predetermined tolerance, and provides notification that the first entity and the second entity are in proximity to each other. For example, there may be a tag on a security gate (first visually unique identifier) and a tag on an authorized user (second visually unique identifier). As the authorized user comes close to the security gate, the method determines that the authorized user is within a predetermined distance/tolerance, and opens the gate. In another example embodiment, a patient should remain in a hospital bed unless accompanied by a nurse or care giver. In this scenario, the method may sound an alarm if the patient leaves the bed, but will not sound the alarm if the method determines that a nurse or care giver (first visually unique identifier) is in proximity to the patient or the patient's bed (second visually unique identifier).

In another example embodiment, the method modifies a status associated with the second entity because of the proximity between the first entity and the second entity. In an example embodiment, the method detects that an unauthorized user is in the vicinity of restricted area (i.e., the unauthorized user is not allowed in the restricted area). In this example embodiment, an authorized user is tagged with the first visually unique identifier and the unauthorized user is tagged with the second visually unique identifier. Based on the proximity between the authorized user (the first visually unique identifier) and the authorized user (second visually unique identifier), the authorized user is acting as an escort for the unauthorized user. The method changes the status of the unauthorized user to that of an authorized user because of the proximity between the authorized user (the first visually unique identifier) and the authorized user (second visually unique identifier).

In an example embodiment, the method provides notification that the first entity and the second entity should not be in proximity to each other. For example, a first chemical is tagged with a first visually unique identifier, and a second chemical is tagged with a second visually unique identifier where the first chemical and the second chemical should not be in proximity to each other. For example, the first visually unique identifier and second visually unique identifier may be color coded tags to indicate reactiveness between the first chemical and the second chemical. When the method detects that the proximity between first chemical and the second chemical has exceeded a predetermined threshold, the method provides notification that the first entity (the first chemical) and the second entity (the second chemical) should not be in proximity to each other. The first visually unique identifier and second visually unique identifier may be combined with a knowledge base of reagent combinations that are dangerous, etc. When the method analyzes the first image and/or the second image to determine the distance assessment, the method may access the knowledge base of reagent combinations to assess whether the distance assessment is within the predetermined threshold for the two chemicals. In another example embodiment, an unauthorized user should not be in a restricted area. In this scenario, the entrance to the restricted area has the first visually unique identifier and the unauthorized user has a visitor tag that is the second visually unique identifier. When the method determines that the unauthorized visitor (second visually unique identifier) is in the proximity of the restricted area (first visually unique identifier), the method provides notification that the unauthorized visitor (second visually unique identifier) should not be in proximity to the restricted area (first visually unique identifier).

In an example embodiment, the method detects that the distance assessment between the first visually unique identifier and the second visually unique identifier exceeds a predetermined range, and provides notification of the change in proximity between the first entity and the second entity. Using the example IV needle (first visually unique identifier) and patient's arm (second visually unique identifier) scenario, when the method forms the distance assessment, the method detects that the distance assessment between the IV needle (first visually unique identifier) and patient's arm (second visually unique identifier) exceeds a predetermined range (for example, the IV needle has fallen out of the patient's arm), and provides notification, for example, to a care giver. In another example embodiment, when the method detects that the distance assessment between the needle (first visually unique identifier) and patient's arm (second visually unique identifier) exceeds a predetermined range (for example, the IV needle has begun to pull out of the vein on the patient's arm, but is still inserted in the injection site on the patient's arm), the method provides notification, for example, to a care giver, to alert the care giver to the situation so that the care giver can address the IV needle before it falls out of the patient's arm. In yet another example embodiment, a patient should remain in a hospital bed, for example, unless accompanied by a nurse or care giver. In this scenario, the patient's hospital gown may be tagged with a first visually unique identifier and the patient's hospital bed may be tagged with a second visually unique identifier. If the patient tries to exit the hospital bed without an escort, the method detects that the distance assessment between the patient (first visually unique identifier) and the patient's hospital bed (second visually unique identifier) exceeds a predetermined range, and provides notification of the change in proximity between the patient (first visually unique identifier) and the patient's hospital bed (second visually unique identifier).

In an example embodiment, when the method detects the distance assessment exceeds a predetermined range, the method determines that the second visually unique identifier is not present in the second image. For example, when the method receives the second image from the second image capturing device, the method determines that the second image contains the first visually unique identifier but not the second visually unique identifier. The method then determines that the distance between the first visually unique identifier and the second visually unique identifier exceeds the predetermined range based on an absence of the second visually unique identifier.

When the method detects that the second entity is tagged with the second visually unique identifier distinguishable from the first visually, the first visually unique identifier or the second visually unique identifier may be a colored visually unique identifier, a patterned visually unique identifier, a shaped visually unique identifier, an image, an electronically active visually unique identifier (for example, an LED, infrared, or visible emitter that blinks a unique pattern that is discernible by the image capturing device), etc. The first visually unique identifier or second visually unique identifier may be a very simple large pattern readable from a distance in multiple positions, for example, in small populations such as one patient in one hospital room with one bed. In another example, a circular bar code, Datamatrix or Quick Response (QR) code may be used. The first visually unique identifier or second visually unique identifier may be a small tag or a large tag. The first visually unique identifier may be an existing tag, such as an employee's badge. Using, for example, video analytics, the method may determine that a person is wearing an employee badge (i.e., a first visually unique identifier or second visually unique identifier) or that a person is not wearing an employee badge (i.e., no visually unique identifier).

When the method receives the second image, from the second image capturing device, the method identifies that the second image capturing device is the same image capturing device as the first image capturing device. In an example embodiment, both the first image capturing device and the second image capturing device may be any type of image capturing device, observation camera, security camera, commonly used pre-installed video equipment, existing video infrastructure in a building, etc. The method does not need an additional dedicated system just for position detection. The first image and the second image may be captured from the same or different views. The first image capturing device and the second image capturing device may be the same or different image capturing devices.

When the method receives the second image, from the second image capturing device, the method detects that the second visually unique identifier is not present in the second image, and then determines a location of the first entity by the absence of the second visually unique identifier. For example, a patient's hospital gown may be tagged with a first visually unique identifier. The patient's pillow in the hospital bed may be tagged with a second visually unique identifier. When the patient is lying in the bed with his or her head on the pillow, the second visually unique identifier is obscured by the patient's head, and therefore, is not present in the second image. The method then determines that the patient is lying in bed by the lack of the second visually unique identifier (i.e., the tag on the patient's pillow) in the second image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a change in object positioning by processing images comprising:
    detecting a first entity coupled to a first visually unique identifier;
    detecting a second entity coupled to a second visually unique identifier distinguishable from the first visually unique identifier;
    receiving a first image captured at a first time, from a first image capturing device, the first image containing the first entity coupled to the first visually unique identifier and the second entity coupled to the second visually unique identifier;
    analyzing the first image to determine a first distance between the first visually unique identifier and the second visually unique identifier;
    receiving a second image captured at a second time, from a second image capturing device, the second image containing the first entity coupled to the first visually unique identifier and the second entity coupled to the second visually unique identifier;
    analyzing the second image to determine a second distance between the first visually unique identifier and the second visually unique identifier;
    comparing the first distance and the second distance to form a distance assessment; and
    based on the distance assessment, determining a change in proximity between the first entity and the second entity.

2. The method of claim 1 further comprising:
    mapping the change in proximity between the first entity and the second entity against a timeline; and
    providing notification if the change in proximity does not meet a predetermined threshold with respect to the timeline.

3. The method of claim 1 further comprising:
    detecting the distance assessment is within a predetermined tolerance; and
    providing notification that the first entity and the second entity are in proximity to each other.

4. The method of claim 3 further comprising:
    modifying a status associated with the second entity because of the proximity between the first entity and the second entity.

5. The method of claim 3 further comprising:
    providing notification that the first entity and the second entity should not be in proximity to each other.

6. The method of claim 1 further comprising:
    detecting the distance assessment exceeds a predetermined range; and
    providing notification of the change in proximity between the first entity and the second entity.

7. The method of claim 6 wherein detecting the distance assessment exceeds a predetermined range comprises:
    determining the second visually unique identifier is not present in the second image; and
    determining the distance between the first visually unique identifier and the second visually unique identifier exceeds the predetermined range based on an absence of the second visually unique identifier.

8. The method of claim 1 wherein detecting the second entity coupled to the second visually unique identifier distinguishable from the first visually unique identifier comprises:
    tagging the second entity with at least one of:
    i) a colored visually unique identifier;
    ii) a patterned visually unique identifier;
    iii) a shaped visually unique identifier;
    iv) an image; and
    v) an electronically active visually unique identifier.

9. The method of claim 1 wherein receiving the second image captured at the second time, from the second image capturing device comprises:
    identifying the second image capturing device is the same image capturing device as the first image capturing device.

10. A computer program product for detecting a change in object positioning by processing images, the computer program product comprising:
    a computer readable storage medium having computer readable program code embodied therewith, the program code executable by a computing processor to:
    detect a first entity coupled to a first visually unique identifier;
    detect a second entity coupled to a second visually unique identifier distinguishable from the first visually unique identifier;
    receive a first image captured at a first time, from a first image capturing device, the first image containing the first entity coupled to the first visually unique identifier and the second entity coupled to the second visually unique identifier;
    analyze the first image to determine a first distance between the first visually unique identifier and the second visually unique identifier;
    receive a second image captured at a second time, from a second image capturing device, the second image containing the first entity coupled to the first visually unique identifier and the second entity coupled to the second visually unique identifier;
    analyze the second image to determine a second distance between the first visually unique identifier and the second visually unique identifier;
    compare the first distance and the second distance to form a distance assessment; and
    based on the distance assessment, determine a change in proximity between the first entity and the second entity.

11. The computer program product of claim 10 further configured to:
  map the change in proximity between the first entity and the second entity against a timeline; and
  provide notification if the change in proximity does not meet a predetermined threshold with respect to the timeline.

12. The computer program product of claim 10 further configured to:
  detect the distance assessment is within a predetermined tolerance; and
  provide notification that the first entity and the second entity are in proximity to each other.

13. The computer program product of claim 12 further configured to:
  provide notification that the first entity and the second entity should not be in proximity to each other.

14. The computer program product of claim 10 further configured to:
  detect the distance assessment exceeds a predetermined range; and
  provide notification of the change in proximity between the first entity and the second entity.

15. A system comprising:
  a computing processor; and
  a computer readable storage medium operationally coupled to the processor, the computer readable storage medium having computer readable program code embodied therewith to be executed by the computing processor, the computer readable program code configured to:
  detect a first entity coupled to a first visually unique identifier;
  detect a second entity coupled to a second visually unique identifier distinguishable from the first visually unique identifier;
  receive a first image captured at a first time, from a first image capturing device, the first image containing the first entity coupled to the first visually unique identifier and the second entity coupled to the second visually unique identifier;
  analyze the first image to determine a first distance between the first visually unique identifier and the second visually unique identifier;
  receive a second image captured at a second time, from a second image capturing device, the second image containing the first entity coupled to the first visually unique identifier and the second entity coupled to the second visually unique identifier;
  analyze the second image to determine a second distance between the first visually unique identifier and the second visually unique identifier;
  compare the first distance and the second distance to form a distance assessment; and
  based on the distance assessment, determine a change in proximity between the first entity and the second entity.

16. The system of claim 15 further configured to:
  map the change in proximity between the first entity and the second entity against a timeline; and
  providing notification if the change in proximity does not meet a predetermined threshold with respect to the timeline.

17. The system of claim 15 further configured to:
  detect the distance assessment is within a predetermined tolerance; and
  provide notification that the first entity and the second entity are in proximity to each other.

18. The system of claim 17 further configured to:
  provide notification that the first entity and the second entity should not be in proximity to each other.

19. The system of claim 15 further configured to:
  detecting the distance assessment exceeds a predetermined range; and
  providing notification of the change in proximity between the first entity and the second entity.

* * * * *